(12) United States Patent
Park et al.

(10) Patent No.: US 7,334,246 B2
(45) Date of Patent: Feb. 19, 2008

(54) OPTICAL PICKUP APPARATUS FOR OPTICAL DISC DRIVE HAVING AN IMPROVED RECEIVING UNIT

(75) Inventors: Soo-han Park, Yongin-si (KR); Bong-gi Kim, Suwon-si (KR); Do-hoan Nam, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 380 days.

(21) Appl. No.: 10/983,581

(22) Filed: Nov. 9, 2004

(65) Prior Publication Data

US 2006/0101480 A1    May 11, 2006

(51) Int. Cl.
*G11B 7/08* (2006.01)
*G11B 7/085* (2006.01)
*G11B 7/09* (2006.01)

(52) U.S. Cl. ............... 720/676; 720/674; 720/675

(58) Field of Classification Search ......... 720/674–676
See application file for complete search history.

(56) References Cited

U.S. PATENT DOCUMENTS 5,872,766 A * 2/1999 Chaya .................. 720/674
6,597,652 B2 * 7/2003 Obara .................. 720/675
6,880,164 B2 * 4/2005 Kato et al. ............ 720/676

FOREIGN PATENT DOCUMENTS

| JP | 62057130 A | * | 3/1987 |
| JP | 02154854 A | * | 6/1990 |
| JP | 11-232804  |   | 8/1999 |
| KR | 1996-0015439 |  | 5/1996 |
| KR | 1998-029878 |   | 7/1998 |
| KR | 1998-040055 |   | 9/1998 |
| KR | 1998-050227 |   | 10/1998 |

\* cited by examiner

*Primary Examiner*—Angel Castro
*Assistant Examiner*—Christopher R. Magee
(74) *Attorney, Agent, or Firm*—Staas & Halsey LLP

(57) ABSTRACT

An optical pickup apparatus for an optical disc drive, including: a base; a turntable disposed above the base and which rotates an optical disc; an optical pickup unit which reciprocates with respect to the turntable in a radial direction of the turntable; a driving part which moves the optical pickup unit with respect to the turntable; and a guide unit having an auxiliary guide which supports an end of the optical pickup unit and which guides the optical pickup unit along a moving path. The optical pickup unit and the auxiliary guide are in line-contact with each other.

7 Claims, 3 Drawing Sheets

OPTICAL PICKUP APPARATUS FOR OPTICAL DISC DRIVE HAVING AN IMPROVED RECEIVING UNIT

BACKGROUND OF THE INVENTION

1. Field of the Invention

The present invention relates to an optical pickup apparatus for an optical disc drive. More particularly, the present invention relates to an optical pickup apparatus for an optical disc drive, which has an improved receiving unit in an optical pickup unit for smooth movement thereof so as to enhance an endurance period thereof.

2. Description of Related Art

Generally, an optical disc player records information on an optical disc such as a compact disc (CD), a CD read-only memory (CD-ROM), a digital video disc (DVD), and a DVD-ROM, and reproduces the recorded information. Referring to FIGS. 1 and 2, an optical disc player includes an optical pickup apparatus 1 for recording and reproducing information by irradiating a light on a recording surface of the optical disc.

As shown in FIGS. 1 and 2, the optical pickup apparatus 1 includes a base 10, a turntable 20 disposed over the base 10, an optical pickup unit 30 with respect to the turntable 20 in a radial motion, and a driving part 40 for moving the optical pickup unit 30 near to and away from the turntable 20.

An optical disc D is rotatably seated in the turntable 20. The optical pickup apparatus 1, while tracking with respect to concentric tracks formed on the optical disc D, records information onto and reads information on the tracks.

The optical pickup unit 30 is connected at one end thereof to a main guide 43, which will be described hereinbelow, by a sliding bearing 31. The other end of the optical pickup unit 30 is provided with an auxiliary guide receiving groove 32 for surface-contact with an auxiliary guide 44.

The driving part 40 includes a driving motor 41, a gear unit 42 for converting a driving force of the driving part 40 to a rotary motion, and a guide unit mounted along a moving direction of the optical pickup unit 30. The guide unit includes a main guide 43 connected to the gear unit 42 at one end thereof and connected to the optical pickup unit 30 by the sliding bearing 31, and an auxiliary guide 44 mounted in the base 10 to support the sliding bearing 31. The guide unit 43 guides the movement of the optical pickup unit 30 reciprocating along a length direction thereof.

However, as shown in FIG. 2, the auxiliary guide 44 reciprocates in surface-contact with the optical pickup unit 30 in a sliding manner, and friction between the contacting areas may hinder the reciprocal movement of the optical pickup unit 30. When the optical pickup unit 30 cannot move smoothly due to the friction, a signal characteristic in recording and reproducing may be deteriorated.

BRIEF SUMMARY

An object of the present invention is to solve at least the above problems and/or disadvantages and to provide at least the advantages described below. Accordingly, an object of the present invention is to provide an optical pickup apparatus for an optical disc drive, having an improved receiving unit in an optical pickup unit for smooth movement of the optical pickup unit, by reducing friction between an auxiliary guide and the optical pickup unit.

According to an aspect of the present invention, there is provided an optical pickup unit including a base, a turntable disposed above the base to rotate an optical disc, an optical pickup unit reciprocating with respect to the turntable in a radial direction of the turntable, a driving part for moving the optical pickup unit near to and away from the turntable, and a guide unit having an auxiliary guide for supporting an end of the optical pickup unit and guiding a moving path of the optical pickup unit. The optical pickup unit and the auxiliary guide are in line-contact with each other.

The optical pickup unit may include an auxiliary guide receiving groove for receiving the auxiliary guide, such that an inner surface of the auxiliary guide receiving groove and the auxiliary guide are in line-contact with each other.

The auxiliary guide receiving groove may have a sliding projection on the inner surface for line-contact with the auxiliary guide. Alternatively, the auxiliary guide may have a sliding projection on an outer surface thereof for line-contact with the auxiliary guide receiving groove.

When the auxiliary guide has the sliding projection, the sliding projection may have a substantially circular section as being cut in a direction perpendicular to a sliding direction.

According to another aspect of the present invention, there is provided an optical pickup apparatus, including: an optical pickup unit which is movable with respect to a turntable in a radial direction of the turntable; and a guide section having an auxiliary guide with an end which guides movement the optical pickup and an auxiliary guide receiving groove at an end of the optical pickup unit and which receives the end of the auxiliary guide. The optical pickup unit and the auxiliary guide are in line-contact with each other.

According to another aspect of the present invention, there is provided an optical pickup apparatus, including: an auxiliary guide; an optical pickup unit connected at an end to a main guide; and an auxiliary guide receiving groove disposed at another end of the optical pickup unit and which guides the optical pickup unit to/from a turntable in line-contact with the auxiliary guide.

According to another aspect of the present invention, there is provided an optical disc drive, having an optical pickup including: an optical pickup unit which is movable with respect to the turntable in a radial direction of the turntable; and a guide section having an auxiliary guide with an end which guides movement the optical pickup and an auxiliary guide receiving groove at an end of the optical pickup unit and which receives the end of the auxiliary guide. The optical pickup unit and the auxiliary guide are in line-contact with each other.

According to another aspect of the present invention, there is provided a method of enhancing a dynamic characteristic of a optical pickup unit, including: providing an auxiliary guide receiving groove disposed at an end of the optical pickup and an auxiliary guide having an end which is received by the auxiliary guide receiving groove through in-line contact; and reducing friction generated from the line-contact by minimizing a surface area of contact between the auxiliary guide receiving groove and the auxiliary guide.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
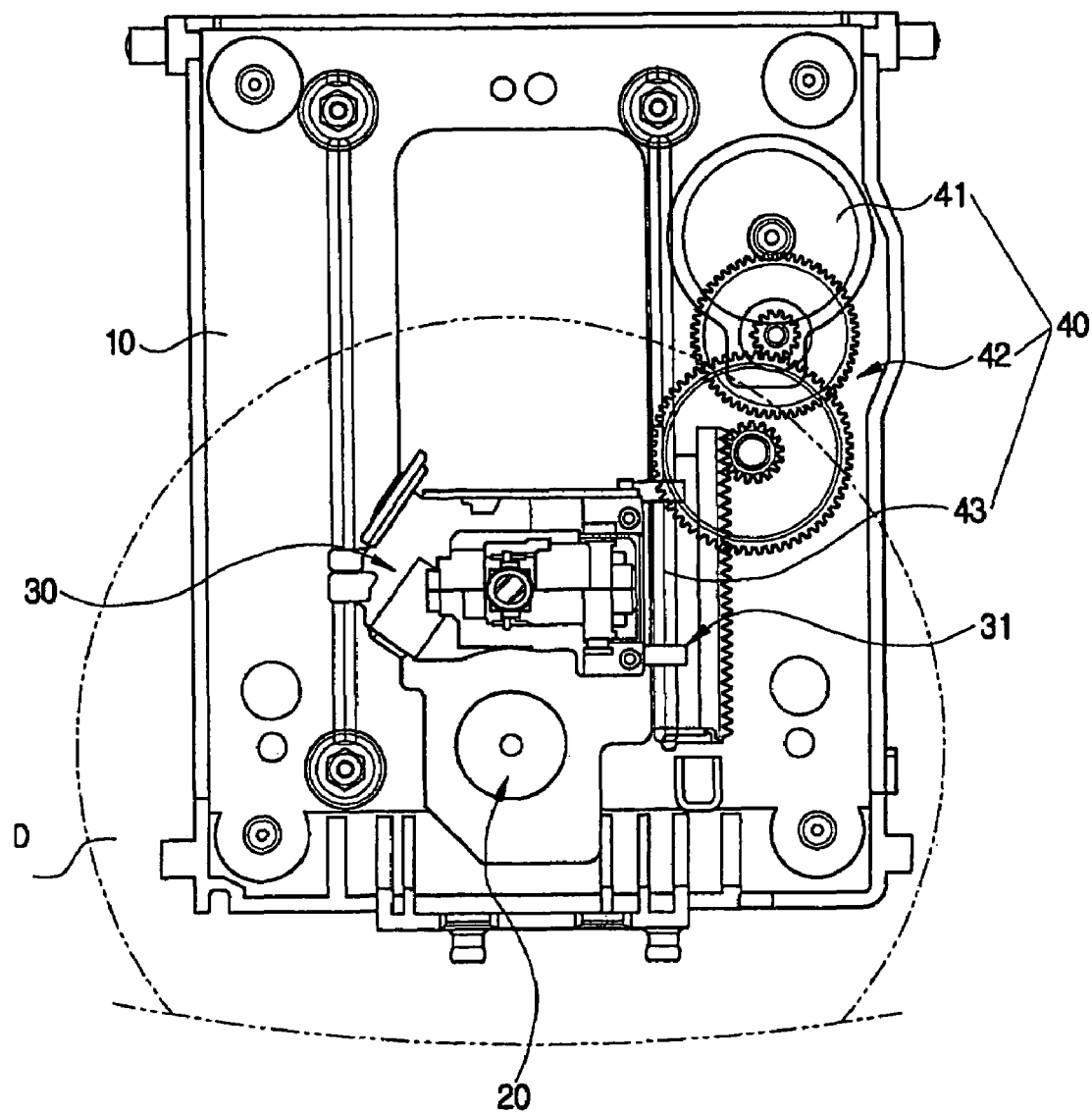
FIG. 1 is a plan view schematically showing the structure of a general optical disc drive.
Figure 2:
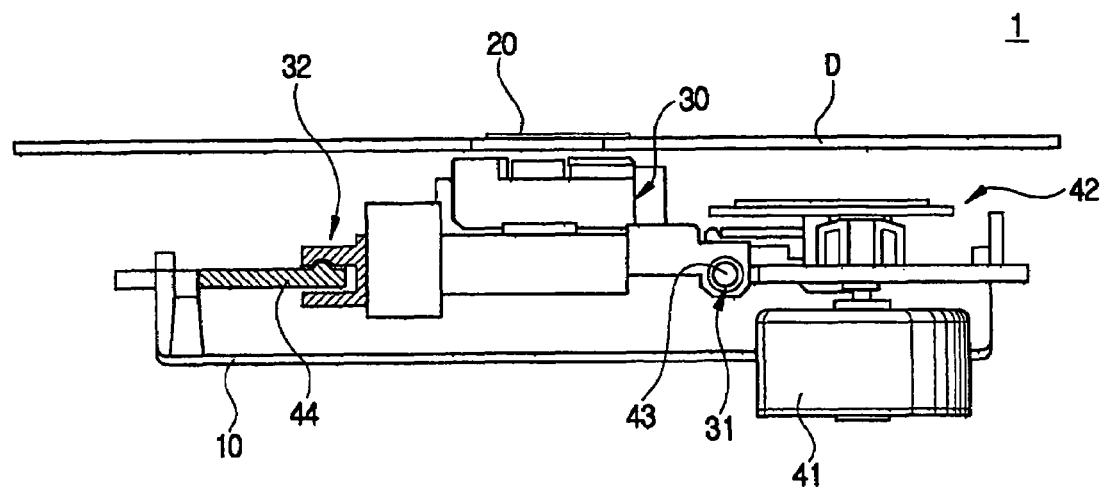
FIG. 2 is a front view schematically showing a general optical disc drive.

Reference will now be made in detail to embodiments of the present invention, examples of which are illustrated in the accompanying drawings, wherein like reference numerals refer to the like elements throughout. The embodiments are described below in order to explain the present invention by referring to the figures.

In the following description, same drawing reference numerals are used for the same elements even in different drawings. Also, well-known functions or constructions of an optical pickup unit of a general optical disc drive, as described in the related art, will not be described in detail.

Figure 3:
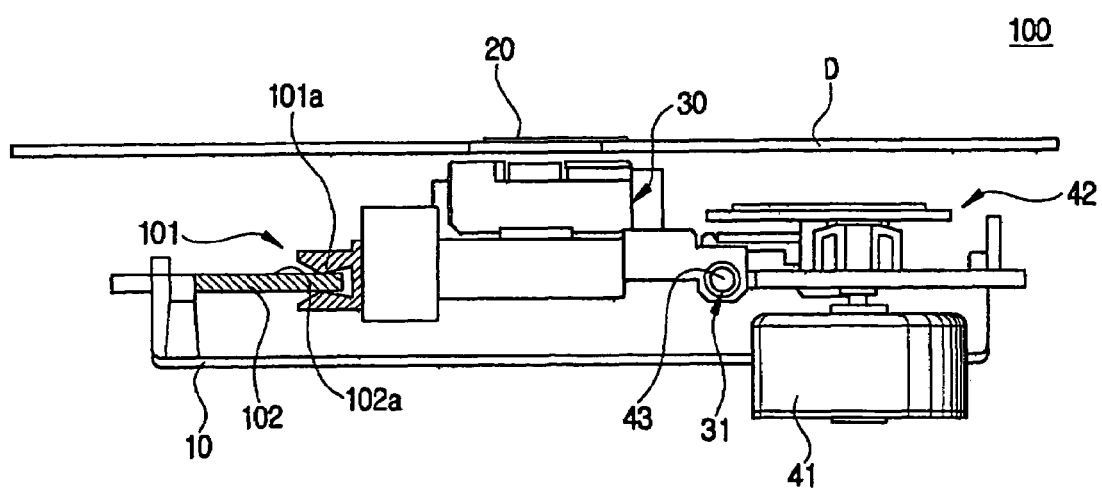
FIG. 3 is a front view schematically showing an optical pickup apparatus of an optical disc drive according to a first embodiment of the present invention.
Figure 4:
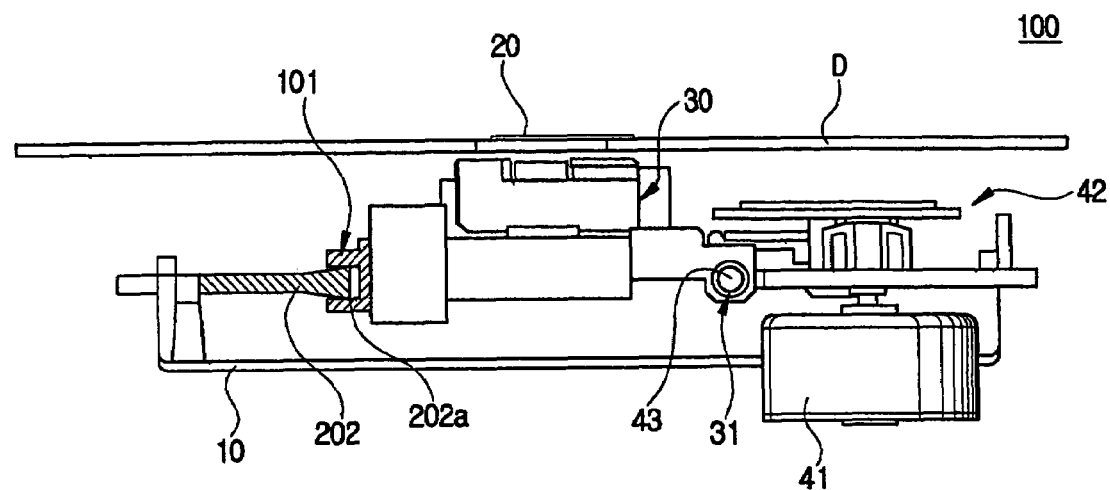
FIG. 4 is a front view schematically showing an optical pickup apparatus of an optical disc drive according to a second embodiment of the present invention.
Figure 5:
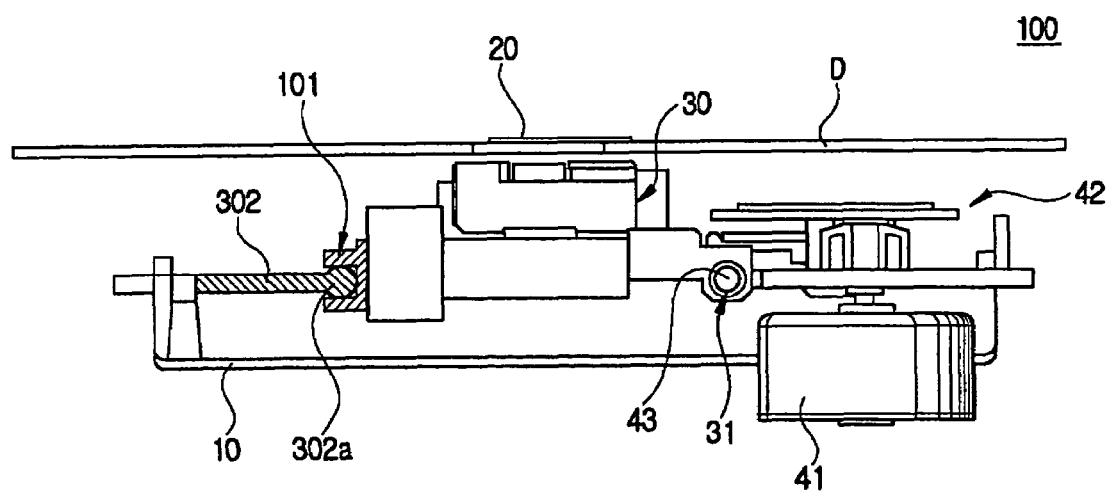
FIG. 5 is a front view schematically showing an optical pickup apparatus of an optical disc drive according to a third embodiment of the present invention.

Referring to FIGS. 3-5, an optical pickup unit 30 provided to an optical pickup apparatus 100 is connected at one end to a main guide 43 by a sliding bearing 31. An auxiliary guide receiving groove 101 provided at the other end of the optical pickup unit 30 guides a path for the optical pickup unit 30 to move near to and away from the turntable 20 in line-contact with an auxiliary guide 102. This is to enhance dynamic characteristic of the optical pickup unit 30 by reducing friction generated from the line-contact between the auxiliary guide receiving groove 101 and the auxiliary guide 102 (FIG. 3), 202 (FIG. 4), and 302 (FIG. 5) during the sliding movement.

The line-contact of the auxiliary guide receiving groove 101 and the auxiliary guide 102 can be achieved by various configurations.

For example, as shown in FIG. 3, a sliding projection 101a may be projected on an inner surface of the auxiliary guide receiving groove 101 to correspond to the auxiliary guide 102, thereby line-contacting with an outer circumferential surface 102a of the auxiliary guide 102.

Alternatively, as shown in FIG. 4, an end of an auxiliary guide 202 may be projected to form a sliding projection 202a for line-contact with the inner surface of the auxiliary guide receiving groove 101.

An auxiliary guide 302 may have a bulbous projected end, as shown in FIG. 5, thereby forming a sliding projection 302a of which a cross section is a substantial circle, for line-contact with the inner surface of the auxiliary guide receiving groove 101.

Hereinbelow, the operation of the optical disc drive according to embodiments of the present invention will be described with reference to FIGS. 3-5.

As shown in the drawings, the optical pickup apparatus 100 of the optical disc drive linearly reciprocates in a radial direction of the optical disc D to read a surface of the optical disc D rotating according to a signal of a certain controller.

The optical pickup unit 30 approaches and leaves the turntable 20 in a manner that one end thereof is supported by the sliding bearing 31 which encloses an outer surface of the main guide 43 and traces a moving path of the main guide 43, and the other end line-contacts with the auxiliary guide 102 by the inner surface of the auxiliary guide receiving groove 101.

The sliding projection can be formed at any side of the contacting surfaces which are the inner surface of the auxiliary guide receiving groove 101 and the outer surface of the auxiliary guide 102. As shown in FIG. 3, the sliding projection 101a may be projected from the inner surface of the auxiliary guide receiving groove 101, and as shown in FIGS. 4 and 5, the auxiliary guide 202 or 302 may have the sliding projection 202a or 302a. However, other various means can be applied as long as the auxiliary guide receiving groove 101 and the auxiliary guide 102 can be in line-contact with each other.

As described above, one end of the optical pickup unit 30 is guided to the main guide 43 through the sliding bearing 31, and the other end moves in a sliding manner so that the auxiliary guide receiving groove 101 contacts with the auxiliary guide 102 by a narrow area. Therefore, friction between the contacting surfaces, generated during the reciprocal movement, can be reduced, thereby enabling smooth movement of the optical pickup unit 30 and further enabling a minute control of the apparatus.

According to the above-described embodiments, in an optical pickup apparatus for the optical disc drive, since a contacting surface between the optical pickup unit and the auxiliary guide is narrowed (i.e., minimized), dynamic characteristic of the optical pickup apparatus is improved, and the signal characteristic is also enhanced during the recording and reproducing performance.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An optical pickup apparatus for an optical disc drive, comprising:
   a base;
   a turntable disposed above the base and which rotates an optical disc;
   an optical pickup unit which reciprocates with respect to the turntable in a radial direction of the turntable;
   a driving part which moves the optical pickup unit with respect to the turntable; a guide unit having an auxiliary guide which supports an end of the optical pickup unit and which guides the optical pickup unit along a moving path; and
   an auxiliary guide receiving groove which receives the auxiliary guide, such that an inner surface of the auxiliary guide receiving groove and a flat side of the auxiliary guide are on opposite sides respectively above and below the auxiliary guide in line-contact with each other.

2. The optical pickup apparatus of claim 1, wherein the auxiliary guide receiving groove has a sliding projection on the inner surface for line-contact with the auxiliary guide.

3. The optical pickup apparatus of claim 1, wherein the sliding projection has a substantially circular cross section in a direction perpendicular to a sliding direction.

4. An optical disc drive, comprising an optical pickup having:

an optical pickup unit which is movable with respect to the turntable in a radial direction of the turntable; and a guide section having an auxiliary guide which guides movement the optical pickup and an auxiliary guide receiving groove at an end of the optical pickup unit, the auxiliary guide receiving groove receiving the end of the auxiliary guide and having a sliding projection, wherein the sliding projection and the auxiliary guide are in line-contact with each other.

5. An optical pickup apparatus, comprising:

an optical pickup unit connected at an end to a main guide;

an auxiliary guide receiving groove disposed at another end of the optical pickup unit and which guides the optical pickup unit to/from a turntable in line-contact with the auxiliary guide; and an auxiliary guide in line-contact with an auxiliary guide receiving groove at a flat side of the auxiliary guide.

6. The pickup apparatus of claim 5, wherein the optical pickup unit is connected to the main guide by a sliding bearing.

7. A method of enhancing a dynamic characteristic of an optical pickup unit, comprising:

providing an auxiliary guide receiving groove disposed at an end of the optical pickup and an auxiliary guide having an end which is received by the auxiliary guide receiving groove through in-line contact; and reducing friction generated from the line-contact by minimizing a surface area of contact between the auxiliary guide receiving groove and the auxiliary guide, the surface area of contact being a flat side of the auxiliary guide.

* * * * *